United States Patent
Nelson et al.

(10) Patent No.: US 11,429,474 B2
(45) Date of Patent: Aug. 30, 2022

(54) ENTERPRISE IOT SYSTEM FOR ONBOARDING AND MAINTAINING PERIPHERAL DEVICES

(71) Applicant: Bank of America Corporation, Charlotte, NC (US)

(72) Inventors: Rebbecca Nelson, Chicago, IL (US); Robert Cain Durbin, Jr., New Hope, PA (US); Chiamaka Azih, Charlotte, NC (US); Jo-Ann Taylor, Goldalming (GB); Vicky Kivuti, Huntersville, NC (US); Angelica Barrera, Chicago, IL (US); Michael Robert Young, Davidson, NC (US); Michael Sbandi, Charlotte, NC (US); Son Huynh, Charlotte, NC (US); Adam Kristian King, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 223 days.

(21) Appl. No.: 16/983,092

(22) Filed: Aug. 3, 2020

(65) Prior Publication Data

US 2022/0037041 A1 Feb. 3, 2022

(51) Int. Cl.
*G06F 11/07* (2006.01)
*G16Y 40/50* (2020.01)
*G06N 20/00* (2019.01)
*H04L 9/40* (2022.01)
(Continued)

(52) U.S. Cl.
CPC ........ *G06F 11/0793* (2013.01); *G06N 20/00* (2019.01); *G16Y 10/75* (2020.01); *G16Y 20/40* (2020.01); *G16Y 40/50* (2020.01); *H04L 63/107* (2013.01); *H04L 63/20* (2013.01)

(58) Field of Classification Search
CPC ..... G06F 11/0793; G16Y 40/50; G16Y 20/40; G16Y 30/10; H04L 63/107; H04L 63/20
See application file for complete search history.

(56) References Cited

U.S. PATENT DOCUMENTS

| 10,007,513 B2 | 6/2018 | Malladi et al. |
| 10,185,934 B2 | 1/2019 | Gupta |
| 10,541,892 B2 | 1/2020 | Sha et al. |

(Continued)

FOREIGN PATENT DOCUMENTS

| EP | 3848859 A1 * | 7/2021 |
| WO | WO2019/241199 | 9/2019 |

(Continued)

*Primary Examiner* — Douglas B Blair
(74) *Attorney, Agent, or Firm* — Weiss & Arons LLP

(57) ABSTRACT

Apparatus and methods for establishing a user Internet of Things ("IoT") system is provided. The method may be performed by a central IoT hub run on a user's personal computing device. The method may include detecting user devices in electronic communication with the central IoT hub and onboarding, to the user IoT system, user devices determined to be in conformance with baseline security protocols and performance characteristics. The onboarded user device may be IoT nodes. The method may include monitoring enterprise data to pre-emptively identify and address probable failures of the IoT nodes prior to failure of the IoT nodes. The method may also include addressing known failures for each IoT node on the user IoT system.

20 Claims, 5 Drawing Sheets

(51) Int. Cl.
    *G16Y 10/75*     (2020.01)
    *G16Y 20/40*     (2020.01)

(56)           References Cited

U.S. PATENT DOCUMENTS

| | | | |
|---|---|---|---|
| 10,599,982 | B2 | 3/2020 | Pal et al. |
| 11,314,493 | B1 * | 4/2022 | Stump ................. G06F 8/60 |
| 2017/0011298 | A1 | 1/2017 | Pal et al. |
| 2018/0060159 | A1 | 3/2018 | Justin et al. |
| 2018/0081972 | A1 | 3/2018 | Mohanbabu et al. |
| 2018/0242149 | A1 * | 8/2018 | Verma .................. H04L 63/08 |
| 2019/0044826 | A1 * | 2/2019 | Flores Guerra ....... H04L 41/22 |
| 2019/0171510 | A1 | 6/2019 | Smith et al. |
| 2021/0303378 | A1 * | 9/2021 | Sethi .................. G06K 9/6263 |
| 2021/0392171 | A1 * | 12/2021 | Srinivas ............... G06N 5/047 |
| 2022/0050733 | A1 * | 2/2022 | Selvaraju ............ G06F 11/008 |

FOREIGN PATENT DOCUMENTS

| | | | |
|---|---|---|---|
| WO | WO2020/008354 | 1/2020 | |
| WO | WO-2020118377 A1 * | 6/2020 | ............ G16Y 40/35 |

* cited by examiner

ENTERPRISE IOT SYSTEM FOR ONBOARDING AND MAINTAINING PERIPHERAL DEVICES

FIELD OF TECHNOLOGY

Aspects of the disclosure relate to providing apparatus and methods for an Internet of Things ("IoT") system. In particular, the disclosure relates to apparatus and methods for managing a user IoT system with one or more user devices onboarded as IoT nodes of the user IoT system.

BACKGROUND

IoT systems have become increasingly popular as a network option for linking together diverse hardware and software and supporting communications therebetween. Typically, IoT nodes on the system need to conform with configuration settings and security protocols of a centralized runbook that sets forth requirements for any IoT node that desires to join the system.

Enterprise companies typically employ a vast number of employees. Different employees are assigned different jobs within the company. As such, different groups of employees may be expected, by the company, to work with different hardware and software, and to comply with varying security protocols. The diverse nature of the employees makes it hard to establish a 'one size fits all' approach to configuration settings and security protocols for all company employees. Instead, customization of configuration settings and security protocols is needed for employees and/or groups of employees based on the nuances of their company responsibilities.

Because of the aforementioned, typical IoT systems relying on a uniform, centralized dataset for establishing system requirements are undesirable for a large company or organization at least because the configuration settings and security protocols for different employees may be vastly different.

Additionally, large companies typically maintain huge data sets relating to error messages generated by devices on its systems and remediation routines built to address device errors. This data may be useful to remediate a current hardware or software error. However, processing such large data sets may require large processing overhead and take a long time to return results, causing system delays and suboptimal outputs.

It would be desirable, therefore, to provide an IoT system that customizes system requirements based on a user's job description. It would be further desirable, therefore, to provide machine learning algorithms to optimize large datasets to initially extract and process select data from large data sets that is statistically more likely to be relevant to the system error at hand. Therefore, it is desirable to provide apparatus and methods for an ENTERPRISE IOT SYSTEM FOR ONBOARDING AND MAINTAINING PERIPHERAL DEVICES.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
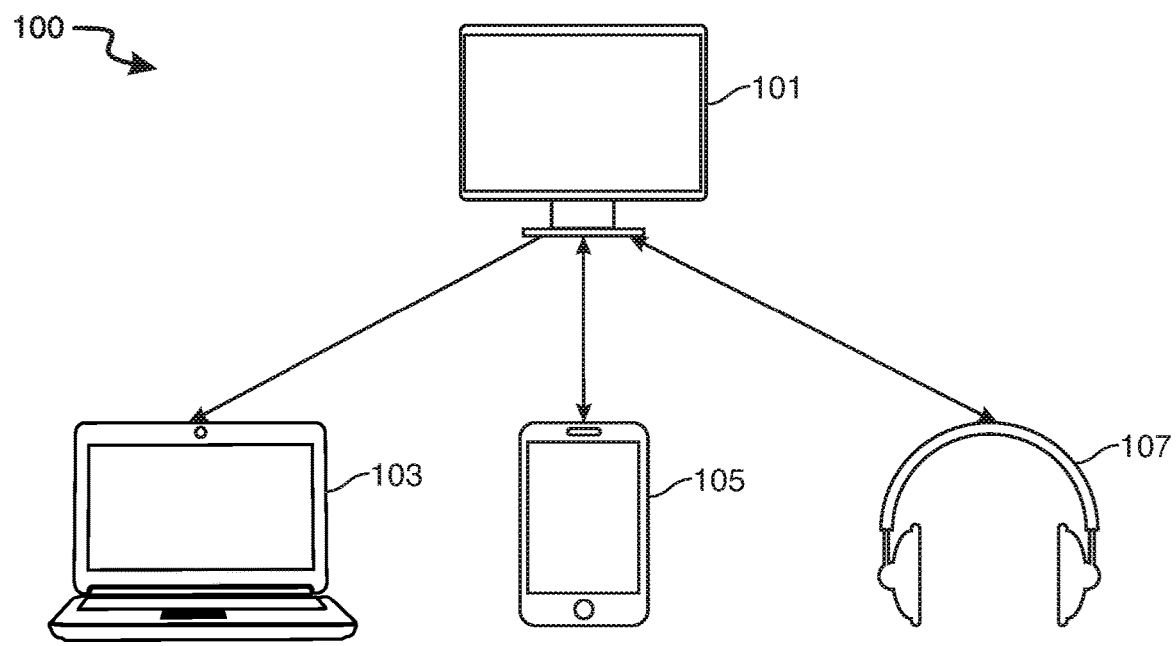
FIG. 1 shows an illustrative system and apparatus in accordance with the invention.

Apparatus and methods for establishing and supporting a user IoT system are provided. The IoT system may include one, two or more IoT nodes. The IoT system may include an IoT hub. The IoT hub may be referred to alternately herein as a central IoT hub. The IoT hub may be one of the IoT nodes. In some embodiments, two or more of the IoT nodes may perform functions described herein as functions being performed by the IoT hub.

The apparatus and methods may be implemented on any hardware devices. An IoT node may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, "smart" devices (e.g., watches, eyeglasses, appliances, clothing having embedded electronic circuitry) mobile phones and/or other personal digital assistants ("PDAs"), multiprocessor systems, RFID tags, microprocessor-based systems, set top boxes, programmable consumer electronics, network PCs, minicomputers, mainframe computers, distributed computing environments that include any of the above systems or devices, and the like.

The methods may be performed by a central IoT hub. An exemplary central IoT hub may be a user's personal computing device, such as a computer, laptop, cell phone, central processing unit stored in a cloud, or any other computing system described herein. When the IoT hub is a remote device, one of the IoT nodes (such as a mobile phone or computer) may act to transmit and receive instructions and information from the IoT nodes/IoT hub and push the information to IoT hub/IoT nodes. IoT nodes and the IoT hub may support internet communication and/or any other methods of wireless or wire-based communication.

The methods may include detecting user devices in electronic communication with the central IoT hub. The detecting the user devices may include proactively scanning an area immediately surrounding the IoT hub for user devices. The user devices may be owned, or in possession of, the user. The device running the IoT hub may be owned, or in possession of, the user.

The onboarding may include determining if the device is a device that the user owns, and/or has been granted permission to use within, for example, a company. The onboarding may include accessing a central database to determine if the user has been granted permission to use the device. If not, the device may not be onboarded to the user IoT system.

The methods may include assessing the detected user devices for conformance with baseline security protocols and performance characteristics. Exemplary data that may be assessed may include security settings, communication protocols, transmission speeds, customized user configuration settings, database storage capacity and any other suitable data. For each user device, the protocols and characteristics may be specific to the user device.

The methods may include onboarding, to the user IoT system, user devices determined to be in conformance with the baseline security protocols and performance characteristics. As discussed below, the baseline security protocols and performance characteristics may be extracted from a central database by the IoT hub. The protocols and characteristics may be associated, in the database, with one or more of the user's LOB, geospatial location and/or job description. The IoT hub may first access the user's LOB, geospatial location and/or job description and subsequently query the database for the protocols and characteristics. Each user device may be associated with its own unique protocols and characteristics.

Each of the onboarded user devices may be an IoT node on the user IoT system. Each of the onboarded user devices may be associated with a device identifier. Advantages of the user IoT system include creating an IoT system where the system requirements are tailored to the user's job within an entity, thus allowing the IoT system to be customized to the user's unique needs.

The methods may include monitoring enterprise data to pre-emptively identify and address probable failures of the IoT nodes prior to failure of the IoT nodes. The monitoring may include, for each IoT node on the user IoT system, periodically requesting, from an enterprise error database, error messages generated from devices associated with the IoT node's device identifier.

The monitoring may also include applying a machine learning model to error messages received from the enterprise database to extract a first subset of error messages. The error messages in the first subset may be messages generated by devices positioned at a geospatial location that is within a predetermined distance of the IoT node.

In response to the identification of a threshold number of first error messages in the first subset, the monitoring may include pulling from the enterprise error database a first remediation routine built to address the first error messages. The first error messages may be a group similar, substantially similar, or identical error messages. The monitoring may include transmitting to the IoT node the first remediation routine and instructions to run the first remediation routine. The transmission may be performed prior to transmission of the first error message from the IoT node to the IoT hub.

The methods may include addressing known failures for each IoT node on the user IoT system. The methods may include receiving from the IoT node a second error message. The second error message may be generated by the IoT node. The second error message may indicate a failure of the IoT node.

The methods may include pulling, from the enterprise error database, second error messages generated by devices associated with the same device identifier as the IoT node. The pulled second error messages may similar, substantially similar, or identical to the second error message generated by the IoT node. The methods may include applying the machine learning model to the pulled error data to extract a second subset of error messages from the pulled error data. The second error messages in the second subset may be generated by devices positioned at a geospatial location within the predetermined distance of the IoT node. The methods may include transmitting a first query to the enterprise error database to return a second remediation routine built to address the second error messages in the second subset.

When the first query returns a second remediation routine, the methods may include transmitting the second remediation routine extracted by the first query to the IoT node together with instructions to run the second remediation routine.

When the first query returns a null value, the methods may include transmitting a second query to the enterprise error database to return a second remediation routine built to address the second error messages in a third subset of error messages. The third subset may include the pulled second error messages less the second subset of error messages.

When the second query returns a second remediation routine, the methods may include transmitting the second remediation routine extracted by the second query to the IoT node together with instructions to run the second remediation routine.

In some embodiments, the user may be employed in a line of business ("LOB") in a company. The user may be associated with the LOB in a central database. In some of these embodiments, the methods may include applying a machine learning model to error messages received from the enterprise database to extract a first subset of error messages. The error messages in the first subset may be generated by devices associated with an employee employed in the LOB. The methods may include applying the machine learning model to the pulled error data to extract a second subset of error messages from the pulled error data. The second error messages in the second subset may have been generated by devices associated with an employee employed in the LOB.

In some embodiments, the assessing the user devices for conformance with baseline security protocols and performance characteristics may include accessing a central database and storing a plurality of baseline security protocols and performance characteristics and identifying the baseline security protocols and the performance characteristics from within the database. The baseline security protocols and performance characteristics may be associated with the LOB in the central database. The identifying may include retrieving a LOB associated with the user in the database, and then identifying baseline security protocols and performance characteristics associated with the retrieved LOB.

The methods may include determining that a user device is not in conformance with the baseline security protocols and performance characteristics. In response to this determination, the methods may include blocking communication between the user's personal computer and the user device determined not to be in conformance. In some embodiments, the determining that the user device is not in conformance may include determining that the user device includes hardware or software that the user is not allowed to use based on the LOB of the user. For example, for the user's LOB, the device identifier may be associated with a device that the user is not allowed to use within the company.

The assessing the user devices for conformance with baseline security protocols and performance characteristics may include accessing a job description of the user stored in a central database and identifying the baseline security protocols and the performance characteristics in the central database. The baseline security protocols and performance characteristics may be associated with the job description in the central database.

The method may include determining that a user device is not in conformance with the baseline security protocols and performance characteristics. The determining that the user device is not in conformance may include determining that the user device includes hardware or software that the user is not allowed to use based on the accessed job description of the user.

The method may include blocking communication between the user's personal computer and the user device determined not to be in conformance.

In some embodiments, the assessing the user devices for conformance with baseline security protocols and performance characteristics may include accessing a geospatial location of the user stored in a central database and identifying the baseline security protocols and the performance characteristics. The baseline security protocols and performance characteristics may be associated with the geospatial location in the central database.

The method may include determining that a user device is not in conformance with the baseline security protocols and performance characteristics. The determining that the user device is not in conformance may include determining that the user device includes hardware or software that the user is not allowed to use based on the accessed geospatial location of the user. The method may include blocking communication between the user's personal computer and the user device determined not to be in conformance.

The method may include, for each of the user devices and prior to the onboarding, accessing a remote server to pull baseline security protocols and performance characteristics associated with the user device. In some embodiments, the performance characteristics may include configuration settings.

The method may include requesting, from the user device, configuration settings for a configurable setting of the user device. The method may include identifying a discrepancy between the pulled performance characteristics and the configuration settings of the user device. The method may include transmitting a patch to the user device to update the configuration settings and bring the configuration settings in conformance with the performance characteristics. The pulled performance characteristics may be associated with one or more of the user's LOB, job description, and/or geospatial location.

For example, the user, based on his LOB and/or his job description, may need his company headset to connect to his computer. This connection may be part of the pulled performance characteristics. The IoT hub may check, during the onboarding, that the headset is in communication with the user's computer. If the headset is not in communication with the user's computer, the IoT hub may attempt to remediate the non-connection.

The method may include receiving a failure message from the user device indicating a failure of the user device to update the configuration settings. The method may include declining to onboard the user device to the user IoT system. Declining to onboard to the user IoT system any device that fails to successfully update the configuration settings may ensure that the devices on the IoT system are each in conformance with the user's required settings.

The method may include receiving, from an IoT node included in the user IoT system, a third error message and a fourth error message. The method may include determining which error message to process first by accessing a job description of the user and identifying, based on stored information associated with the job description, one of the third error message and the fourth error message as a higher impact error message. The method may include processing first the error message identified as the higher impact error message.

For example, a user's job description may include a hierarchy of hardware and software, the hierarchy ranking an importance of each of the hardware and software based on the user's job description. The IoT hub may access the ranking of each of the devices that have failed, based on the error messages, and then process first the error message generated by the highest-ranking device. The highest-ranking device may be the device most important to the user's job description.

The method may include proactively pinging each IoT node on the user IoT system to request a transfer of an error message generated by each IoT node to the IoT hub.

The monitoring of the enterprise data to pre-emptively identify and address probable failures of the IoT nodes prior to failure of the IoT nodes may also include, for each IoT node on the user IoT system, identifying a help desk identifier associated with the user IoT system. The help desk identifier may identify a help desk assigned to the user IoT system for remediating failures of the user IoT system.

The methods may include periodically requesting, from a help desk historical database associated with the help desk identifier, error messages received by the help desk that were generated by devices associated with a device identifier identical to a device identifier of the IoT node. The methods may include, in response to accumulating a threshold number of identical error messages generated within a predetermined time period, pulling from the help desk historical database a remediation routine built to remediate the identical error messages. The methods may also include transmitting, to the IoT node, the pulled remediation routine and instructions to run the pulled remediation routine.

The methods may include receiving a null value from the help desk historical database in response to the pulling of the remediation routine. The methods may include, in response to receipt of the null value, generating a message, to the user, of a possible failure of the IoT node.

The methods may include, for each of the IoT nodes, requesting the IoT node to transmit to the IoT hub customized configuration settings of the IoT node. The IoT hub may request this information periodically, such as upon the lapse of a predetermined time period. In some embodiments, the IoT hub may instruct the IoT nodes to push this information to the IoT hub periodically or when a configuration setting has been changed by the user.

The methods may also include pinging the IoT node and not receiving a response from the IoT node. The methods may further include determining, based on a lack of response from the IoT node to the pinging over a predetermined time period, that the IoT node has deleted itself from the IoT system.

The IoT hub may determine that the IoT node has deleted itself from the IoT system in response to receiving a message, from the IoT node, that the IoT node is proceeding to delete itself from the IoT system.

The methods may include detecting a new user device in electronic communication with the central IoT hub. The new user device may be a similar or identical piece of hardware to the IoT node that deleted itself from the IoT system. For example, the new user device may be the same type of hardware as the IoT node that deleted itself from the IoT system. In exemplary embodiments, the new user device and the IoT node that deleted itself from the system may both be headsets, cell phones, lap top computers, or any other suitable devices. In exemplary embodiments, the new user device and the IoT node that deleted itself from the system may both be devices manufactured by the same company, and, in some embodiments, having the same model and/or version number.

When the new user device is onboarded to the IoT system and becomes a new IoT node, the methods may include transmitting to the new IoT node the configuration settings and instructing the new IoT node to adopt the transferred configuration settings. This may avoid the user having to set the new device to his preferred configuration settings. Instead, the IoT hub may automatically set the new device to the user's preferred configuration settings.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows illustrative system architecture 100. Architecture 100 may include apparatus running on a user IoT system. The apparatus may include computer 101. Computer 101 may be the IoT hub. Computer 101 may be a user's personal computing system. As detailed above, other apparatus may perform the functionalities of the IoT hub, such as a central server, application(s) running on a cloud, or any other suitable hardware and software. In some of these embodiments, computer 101 may be an IoT node running on the IoT system.

Figure 3:
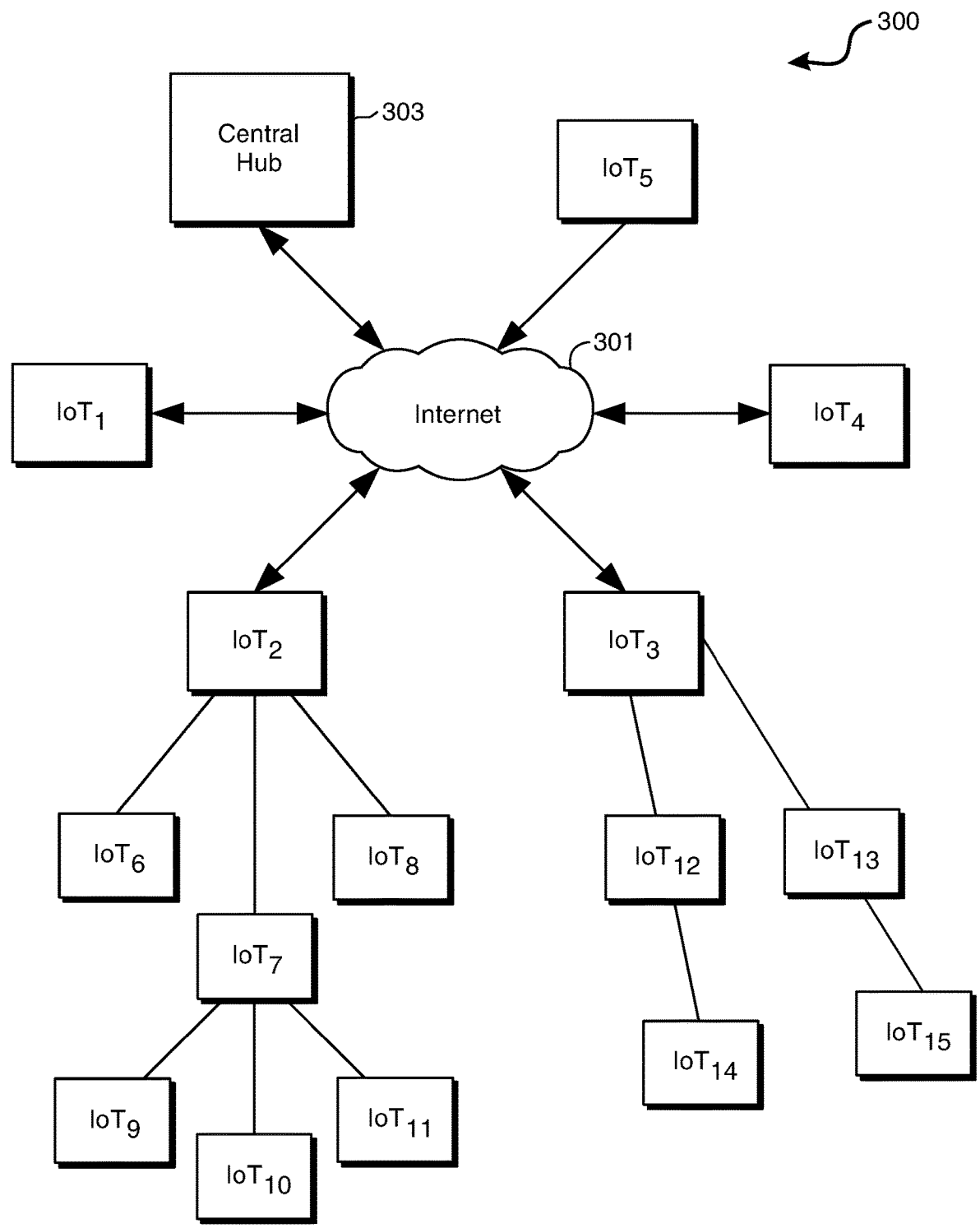
FIG. 3 shows an illustrative system and apparatus in accordance with the invention.

The apparatus may also include IoT nodes running on the IoT system. Exemplary IoT nodes that may run on the user IoT system may include laptop 103, smart phone 105 and headset 107. Each of the IoT nodes may be in electronic communication with additional IoT nodes, as illustrated in FIG. 3.

In some embodiments, each IoT node on the user IoT system may be in direct electronic communication with the IoT hub.

In some embodiments, a first IoT node on the user IoT system may be in electronic communication with the IoT hub by transmitting communications through a second IoT node on the user IoT system. In some of these embodiments, the IoT hub may communicate with the first IoT hub by sending communications to the first IoT node via the second IoT node.

Figure 2:
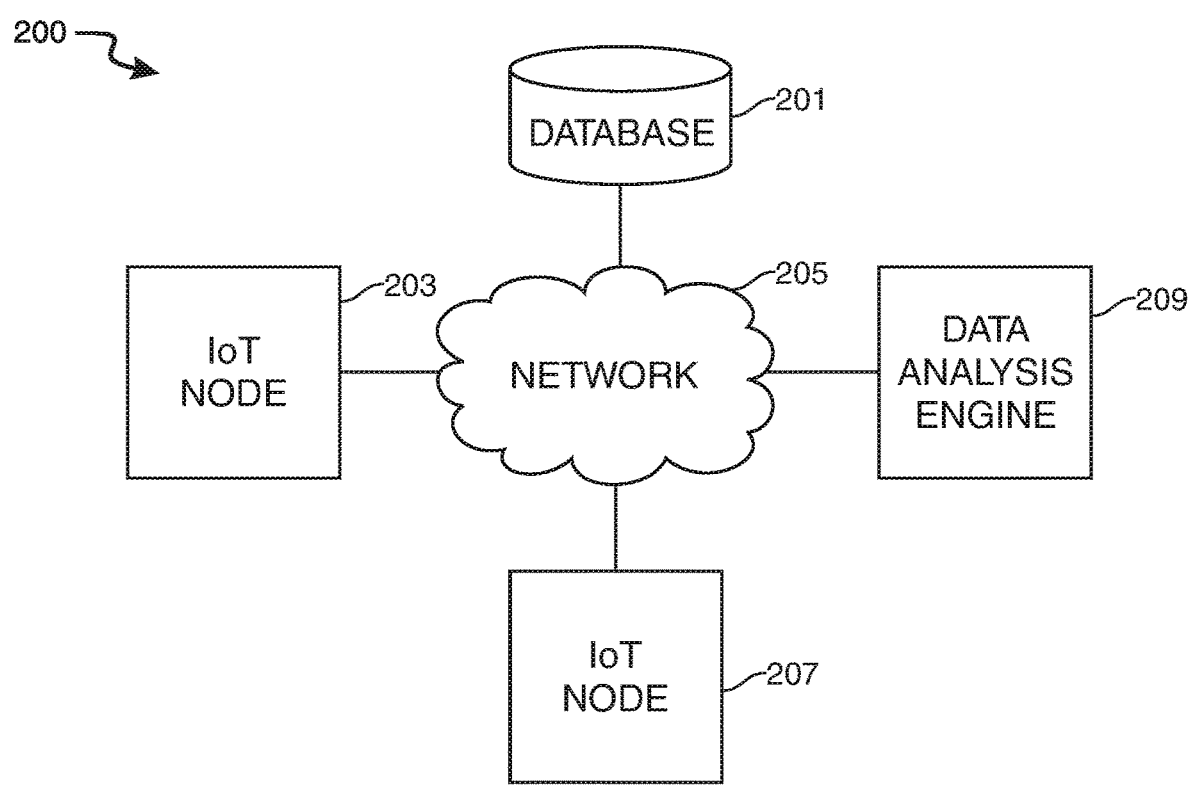
FIG. 2 shows an illustrative system and apparatus in accordance with the invention.

FIG. 2 shows illustrative system architecture 200. Architecture 200 may represent the user IoT system. A differentiator between IoT and conventional networks is a traffic profile. In an IoT, nodes may not have defined or known network positions, communication protocols or security services. Solutions that allow architecture 200 to function seamlessly and leverage such disparate components are disclosed herein.

Architecture 200 may include IoT nodes. Each node may include two or more nodes. FIG. 2 shows exemplary nodes 201 and 203. Nodes 201 and/or 203 may execute one or more of the functions of the IoT hub described herein. The IoT hub may include, or may be in electronic communication with, database 201 and/or data analysis engine 209. Database 201 may include the enterprise database, the central database and the help desk historical database. In some embodiments, the IoT hub may include, or may be in electronic communication with, two or more databases including the aforementioned databases. The IoT hub may include any additional hardware such as receivers, transmitters, processors, databases, and any other suitable hardware.

One or more of the IoT nodes may be hardware devices such as computers, smart phones, laptops, headsets, smart watches, or any other suitable devices. One or more of the IoT nodes may be sensors. A sensor may be a device that detect changes in a physical or virtual environment. For example, sensors may measure audio, rainfall, temperature or water levels. Sensors may measure electronic network traffic, electronic signals (e.g., input or output) or frequency of user logins from within a predefined geographic area.

Sensors may be any suitable size. For example, sensors may be a few millimeters in size. Sensors may be deployed in a wide variety of locations. For example, sensors may be deployed in military battlefields, industrial plants, in orchards, in clothing, automobiles, smart phones, jewelry or refrigerators. Sensors may be relatively inexpensive and have low energy consumption. Sensors may "sense" two or more stimuli or environmental changes.

Sensors may implement two or more functions. For example, sensors may measure changes in their native environment, capture data related to the measured changes store and communicate the captured data. Sensors may be accessed by other sensors or any other node. Sensors may transmit captured data to another node. Sensors may broadcast captured data to two or more nodes.

Captured data may be transmitted using any suitable transmission method. For example, data captured by a sensor may be extracted by a mobile phone. Sensors may leverage a communication link provided by a mobile phone to communicate captured data to another node.

Each sensor may be an IoT node and each sensor may be assigned a unique identifier. For example, sensors may be identified by one or more radio frequency identification ("RFID") tags. The RFID tag may be stimulated to transmit identity information about the sensor or any other information stored on the RFID tag.

Captured data may be transmitted by the sensor and processed far from the location of the sensor that captured the data. For example, captured data may be transmitted from one node to another node until the captured data reaches database 201.

Generally, IoT nodes that form part of architecture 200 may include a processor circuit. The processor circuit may control overall operation of an IoT node and its associated components. A processor circuit may include hardware, such as one or more integrated circuits that form a chipset. The hardware may include digital or analog logic circuitry configured to perform any suitable operation.

A processor circuit may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures, captured data, electronic signatures of biometric features or any other suitable information or data structures. Components of a processor circuit may be coupled together by a system bus, wirelessly or by other interconnections and may be present on one or more circuit boards. In some embodiments, the components may be integrated into a single chip. The chip may be silicon-based.

The IoT node may include RAM, ROM, an input/output ("I/O") module and a non-transitory or non-volatile memory. The I/O module may include a microphone, button and/or touch screen which may accept user-provided input. The I/O module may include one or more of speakers for providing audio output and a video display for providing textual, audiovisual and/or graphical output.

Software applications may be stored within the non-transitory memory and/or other storage medium. Software applications may provide instructions to the processor for enabling a node to perform various functions. For example, the non-transitory memory may store software applications used by a node, such as an operating system, application programs, and an associated database. Alternatively, some or all of computer executable instructions of a node may be embodied in hardware or firmware components of the node.

Software application programs, which may be used by an IoT node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

As shown in FIG. 2, an IoT node may operate in a networked environment. An IoT node may be part of two or more networks. An IoT node may support establishing network connections to one or more remote IoT nodes. Such remote IoT nodes may be sensors, actuators or other computing devices. IoT nodes may be personal computers or servers. Network connections may include a local area network ("LAN") and a wide area network ("WAN"), and may also include other networks. When used in a LAN networking environment, an IoT node may be connected to the LAN through a network interface or adapter. The communication circuit may include the network interface or adapter.

When used in a WAN networking environment, an IoT node may include a modem or other circuitry for establishing communications over a WAN, such as the Internet. The communication circuit may include the modem.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

IoT nodes may include various other components, such as a battery, speaker, and antennas. IoT nodes may be portable devices such as a laptop, tablet, smartphone, "smart" devices (e.g., watches, eyeglasses, clothing having embedded electronic circuitry) or any other suitable device for receiving, storing, transmitting and/or displaying relevant information.

An IoT node may include a display constructed using organic light emitting diode ("OLED") technology. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

IoT nodes may utilize computer-executable instructions, such as program modules, being executed by a computer. Generally, program modules include routines, programs, objects, components, data structures, etc. that perform particular tasks or implement particular abstract data types. An IoT node may be operational with distributed computing environments where tasks are performed by remote processing devices that are linked through a communications network. In a distributed computing environment, program modules may be located in both local and remote computer storage media including memory storage devices. IoT nodes may rely on a network of remote servers hosted on the Internet to store, manage, and process data (e.g., "cloud computing").

IoT nodes may include a battery. The battery may be a power source for electronic components of the node. For example, the battery may supply power to the display, the communication circuit and the processor circuit. In some embodiments, a node may include a plurality of batteries. Nodes may include solar panels that convert solar energy into electricity that powers one or more components of a node.

Interoperability may be implemented across any suitable IoT nodes of architecture 200. Interoperability may enable communication between IoT node 203, IoT node 207, and any other nodes included on the user IoT system.

Data analysis engine 209 may filter data received by, or transmitted to, IoT node 203, IoT node 207, the IoT hub (not shown) or any other IoT node on the network. Data analysis engine 203 may repackage or reformat captured data. Data analysis engine 203 may use one or more machine learning algorithms to process data.

Data travelling within architecture 200 to/from IoT nodes may be routed along multiple communication links until the transmitted information reaches a desired destination IoT node. Each communication link may service a number of connected nodes and a respective volume of informational traffic.

Database 201 may receive data transmitted to the IoT hub by the IoT nodes. In some embodiments, data transmitted by IoT nodes may be transmitted directly to data analysis engine 209. Data stored in database 201 may be sorted and analyzed by data analysis engine 209.

Generally, IoT nodes of architecture 200 may interact and cooperate using one or more interaction paradigms. Exemplary interaction paradigms include client-server and peer-to-peer interactions. Illustrative communication protocols may include HyperText Transfer Protocol ("HTTP"), Simple Object Access Protocol ("SOAP"), Representational State Transfer ("REST") Constrained Application Protocol ("CoAP") or SensorML.

As a result of the disparate nature of the IoT nodes, an architecture, such as architecture 200, may support a variety of communication protocols. Illustrative supported protocols may include IEEE 802.15.4 ("ZigBee"), IEEE 802.11, 3G and 4G and LTE. For example, ZigBee requires approximately 20 to 60 mW (for 2 mW transmission power, a range of 20 to 200 meters and a data transmission rate of 250 kbit/s).

To conserve energy, an IoT node may communicate wirelessly for short periods of time. Utilizing this approach, one or more standard size single cell cylindrical dry battery batteries (e.g., AA size) may provide requisite computing power and wireless communication for many months.

Communication protocols used by IoT nodes may not have, or may not be capable of having, security capabilities. A security layer or buffer may be implemented by nodes that receive or rely on data captured by insecure IoT nodes. IoT nodes may be dynamically added or removed from an architecture. A security layer or buffer may be modular to scale quickly and meet growth/contraction requirements.

A physical layer may physically link nodes of architecture 200. The function of this physical layer is to provide communication pathways to carry and exchange data and network information between multiple sub-networks and nodes.

FIG. 3 shows illustrative system 300. Illustrative system 300 may include central hub 303. Central hub 303 may have electronic communication with Internet 301. System 300 may also include nodes $IoT_1$, $IoT_2$, $IoT_3$, $IoT_4$ and $IoT_5$. Each of nodes $IoT_1$, $IoT_2$, $IoT_3$, $IoT_4$ and $IoT_5$ have electronic communication with Internet 301.

Nodes $IoT_2$ and $IoT_3$ are each in electronic communication with additional groups of nodes that do not support an internet connection. $IoT_2$ is in electronic communication with nodes $IoT_6$, $IoT_7$, $IoT_8$, $IoT_9$, $IoT_{10}$ and $IoT_{11}$. $IoT_3$ is in electronic communication with nodes $IoT_{12}$, $IoT_{13}$, $IoT_{14}$ and $IoT_{15}$.

Central hub 303 may group nodes $IoT_1$, $IoT_2$, $IoT_3$, $IoT_4$ and $IoT_5$ into a first group and a second group. Central hub 303 may be assigned as an owner of nodes $IoT_1$, $IoT_2$, $IoT_3$, $IoT_4$ and $IoT_5$.

$IoT_2$ may be assigned as an owner of nodes $IoT_6$, $IoT_7$, $IoT_8$, $IoT_9$, $IoT_{10}$ and $IoT_{11}$. Thus, $IoT_2$ may be an IoT node owner of nodes $IoT_6$, $IoT_7$, $IoT_8$, $IoT_9$, $IoT_{10}$ and $IoT_{11}$, and therefore may own nodes $IoT_6$, $IoT_7$, $IoT_8$, $IoT_9$, $IoT_{10}$ and $IoT_{11}$.

$IoT_3$ may be assigned as an owner of $IoT_{12}$, $IoT_{13}$, $IoT_{14}$ and $IoT_{15}$. Thus, $IoT_3$ may be an IoT node owner of nodes $IoT_{12}$, $IoT_{13}$, $IoT_{14}$ and $IoT_{15}$, and therefore may own nodes $IoT_{12}$, $IoT_{13}$, $IoT_{14}$ and IoT is.

When central hub 303 transmits a system update to owners $IoT_2$ and $IoT_3$, owners $IoT_2$ and $IoT_3$ may transmit the system update to their respective owned nodes. In the event that a node owned by an IoT node owner is in communication with a remote node that is not in communication with the IoT owner, the node will be instructed to transmit the system update to the remote node. For example, $IoT_7$ may be instructed to transmit the system update to nodes $IoT_9$, $IoT_{10}$ and $IoT_{11}$ if nodes $IoT_9$, $IoT_{10}$ and $IoT_{11}$ are not in communication with $IoT_2$.

Figure 4:
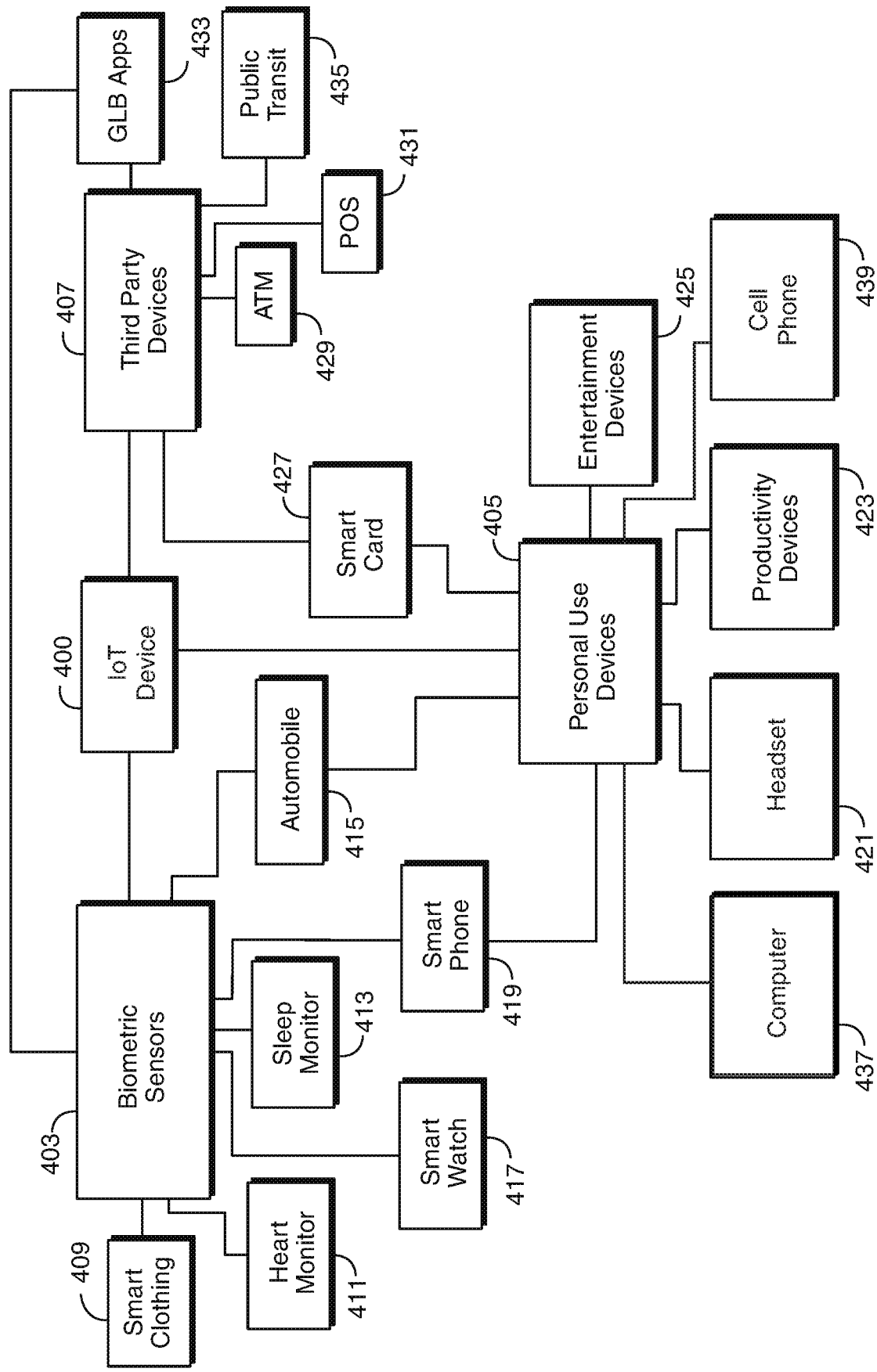
FIG. 4 shows an illustrative system and apparatus in accordance with the invention.

FIG. 4 shows illustrative IoT devices 400. Some or all of the IoT devices 400 may be IoT nodes in the IoT user system.

Exemplary IoT devices 400 may include sensors 403. Sensors 403 may sense biometric attributes. For example, biometric sensors may be embedded in "smart" clothing 409 that monitors a wearer's physical condition. Such clothing may capture biometric data, such as pulse rate, temperature, muscle contraction, heart rhythm and physical movement. Smart clothing may be linked to smart phone 419 such as via a Bluetooth® communication link. Smart phone 419 may transmit data captured by smart clothing 409 to one or more other network nodes.

Sensors 403 may include other illustrative sensors such as heart monitor 411, sleep monitor 413, smart watch 419, smart phone 419 and automobile 415.

IoT devices 400 may include personal use devices 405. Personal use devices 405 may include devices such as computer 437, cell phone 439, smart phone 419, entertainment devices 425, headset 421 and/or productivity devices 423. Productivity devices 423 may include tablets, laptops or other personal computing devices. Entertainment devices 425 may include gaming consoles and the like.

IoT devices 400 also include third-party devices 407. Third-party devices may include devices that are not under the direct or exclusive control of a user. A user may interact with third-party devices 407 to obtain a desired service provided by the third-party.

Exemplary third-party devices include smart card 427. Smart card 427 may function as a purchasing instrument. Illustrative purchasing instruments may conform to specifications published by the International Organization for Standardization. Such specifications may include: ISO/IEC 7810, ISO/IEC 7811 and ISO/IEC 7816, which are hereby incorporated herein by reference in their entireties. Suitable purchasing instruments may include a credit card, debit card and electronic purchasing devices. Such purchasing instruments may sense a location or frequency of use.

Such purchasing instruments may include "EMV" chips. EMV is a technology that derives its name from the companies (Europay, MasterCard, and Visa) that helped develop the technology. When the credit card and its associated EMV chip are inserted into a specialized card reader (another sensor), the reader powers the EMV chip and the EMV chip generates a new authorization code each time the credit card is used. The EMV chip may capture transaction data such as amounts, location or identity of the chip reader.

Third-party sensors 407 may include ATMs 429 and point-of-sale terminals ("POS") 431.

Third-party devices 407 may also include software applications 433. Applications 433 may be used to access services, such as an online banking portal. Such applications may detect biometric features to authorize access to the online banking portal. Third-party devices 407 may include sensors that capture data associated with power consumption (e.g., smart grids), electronic communication traffic, logistics (package movement) or any other suitable environmental condition.

FIG. 4 shows that sensors may categorically overlap. For example, an application used to access an online bank portal may capture a biometric feature (e.g., fingerprint) to authenticate a user.

Each of the IoT devices shown in FIG. 4 may include different and possibly incompatible hardware. For example, IoT devices 400 may each have different operating systems (or none at all), processor types and memory. Some of the IoT devices 400 may be inexpensive, single-function devices with rudimentary network connectivity. One or more IoT devices 400 may be positioned in remote and/or inaccessible locations where human intervention or configuration is difficult.

Figure 5:
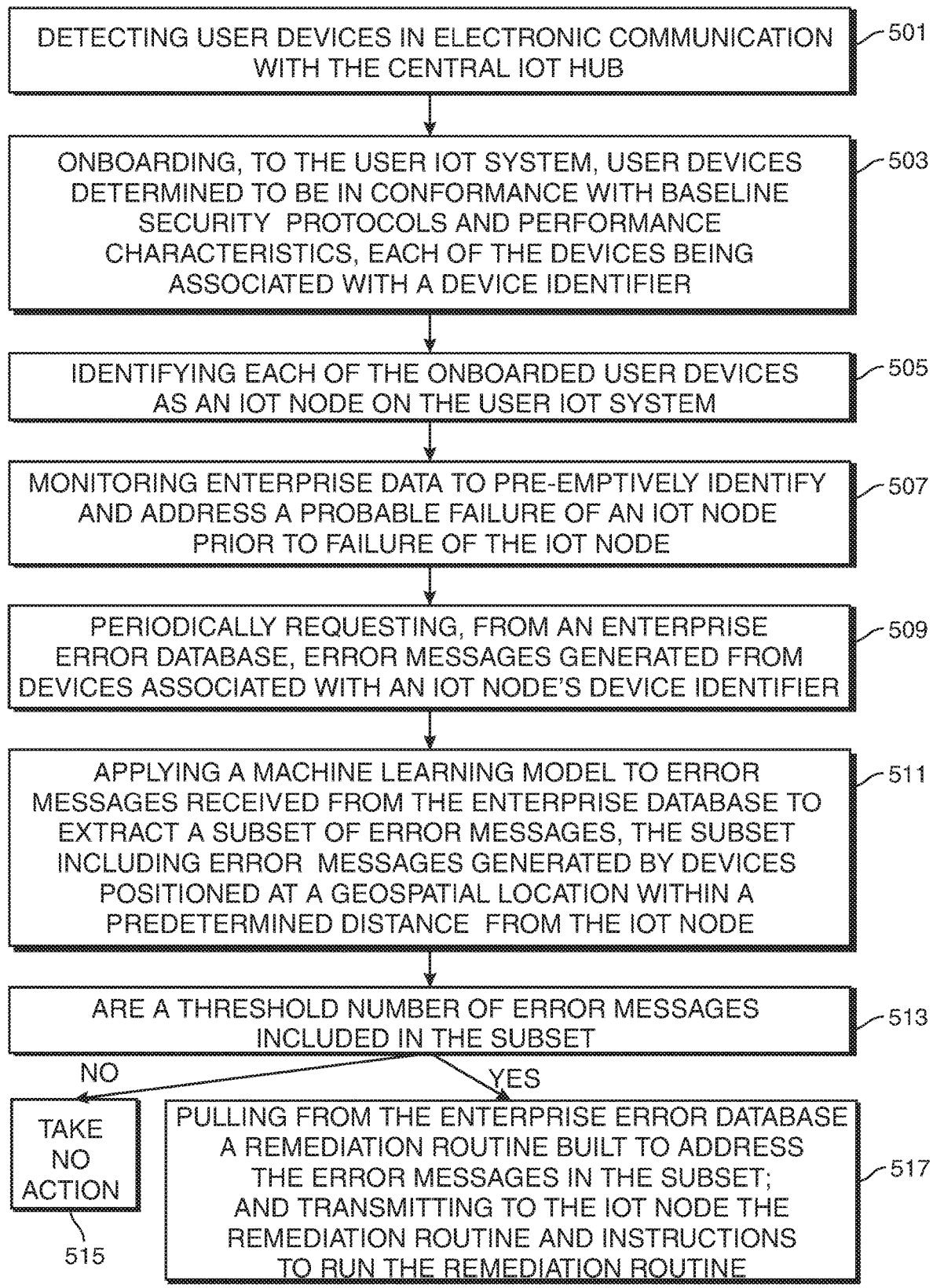
FIG. 5 shows an illustrative method in accordance with the invention.

FIG. 5 shows an illustrative method in accordance with the invention. The illustrative method shown in FIG. 5 may include one or more of steps 501-517. The illustrative method may include steps not shown in FIG. 5 but described herein.

The method may include, at step 501, detecting user devices in electronic communication with the central IoT hub. The method may include, at step 503, onboarding, to the user IoT system, user devices determined to be in conformance with baseline security protocols and performance characteristics, each of the devices being associated with a device identifier.

The method may include, at step 505, identifying each of the onboarded user devices as an IoT node on the user IoT system. The method may include, at step 507, monitoring enterprise data to pre-emptively identify and address a probable failure of an IoT nodes prior to failure of the IoT node.

The method may include, at step 509, periodically requesting, from an enterprise error database, error messages generated from devices associated with the IoT node's device identifier. The method may include, at step 511, applying a machine learning model to error messages received from the enterprise database to extract a subset of error messages including the error messages generated by devices positioned at a geospatial location within a predetermined distance of the IoT node.

The method may include, at step 513, determining if there are a threshold number of error messages included in the subset. If there is not a threshold number of error messages included in the subset, the method may include, at step 515, taking no action. If there are a threshold number of error messages included in the subset, the method may include, at step 517, pulling from the enterprise error database a remediation routine built to address the error messages and transmitting to the IoT node the remediation routine and instructions to run the remediation routine.

Figure 6:
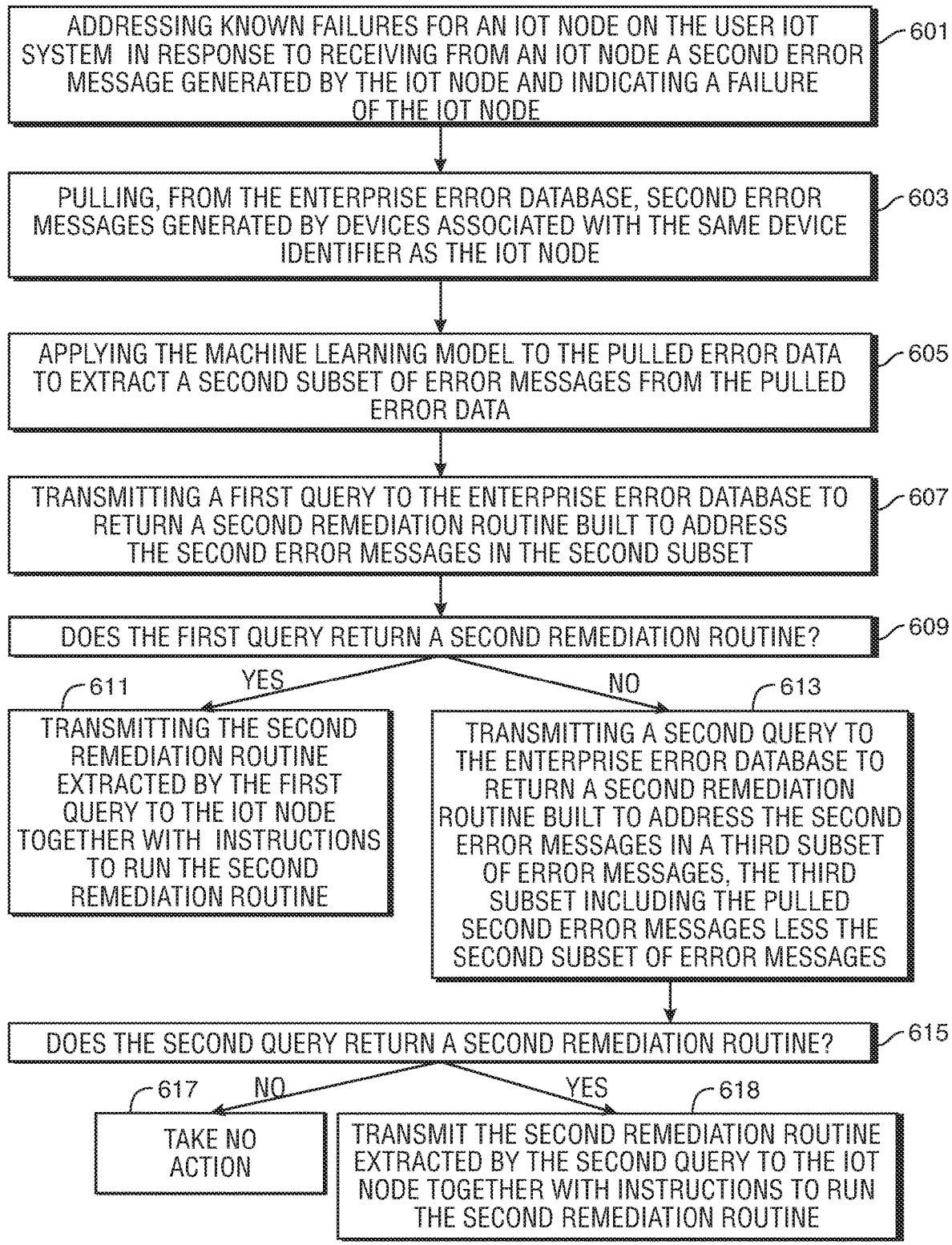
FIG. 6 shows an illustrative method in accordance with the invention.

FIG. 6 shows an illustrative method in accordance with the invention. The illustrative method shown in FIG. 6 may include one or more of steps 601-619. The illustrative method may include steps not shown in FIG. 6 but described herein.

The method may include, at step 601, addressing known failures for an IoT node on the user IoT system by receiving from the IoT node a second error message generated by the IoT node and indicating a failure of the IoT node. The method may include, at step 603, pulling, from the enterprise error database, second error messages generated by devices associated with the same device identifier as the IoT node.

The method may include, at step 605, applying the machine learning model to the pulled error data to extract a second subset of error messages from the pulled error data. The method may include, at step 607, transmitting a first query to the enterprise error database to return a second remediation routine built to address the second error messages in the second subset.

The method may include, at step 609, determining if the first query returned a second remediation routine. If the first query did return a second remediation routine, the method may include, at step 611, transmitting the second remediation routine extracted by the first query to the IoT node together with instructions to run the second remediation routine. If the first query did not return a second remediation routine, the method may include, at step 613, transmitting a second query to the enterprise error database to return a second remediation routine built to address the second error messages in a third subset of error messages, the third subset including the pulled second error messages less the second subset of error messages.

The method may include, at step 615, determining if the second query return a second remediation routine. If the second query does not return a second remediation routine, the method may include, at step 617, taking no action. If the second query does return a second remediation routine, the method may include, at step 619, transmitting the second remediation routine extracted by the second query to the IoT node together with instructions to run the second remediation routine.

Thus, systems and methods for an ENTERPRISE IOT SYSTEM FOR ONBOARDING AND MAINTAINING PERIPHERAL DEVICES have been provided. Persons skilled in the art will appreciate that the present invention can be practiced by other than the described embodiments, which are presented for purposes of illustration rather than of limitation.

What is claimed is:

1. A method for establishing and supporting a user Internet of Things ("IoT") system, the method being performed by a central IoT hub run on a user's personal computing device, the method comprising:

detecting user devices in electronic communication with the central IoT hub;

assessing the user devices for conformance with baseline security protocols and performance characteristics;

onboarding, to the user IoT system, user devices determined to be in conformance with the baseline security protocols and performance characteristics, each of the onboarded user devices being an IoT node on the user IoT system and being associated with a device identifier;

monitoring enterprise data to pre-emptively identify and address probable failures of the IoT nodes prior to failure of the IoT nodes, the monitoring including, for each IoT node on the user IoT system:

periodically requesting, from an enterprise error database, error messages generated from devices associated with the IoT node's device identifier;

applying a machine learning model to error messages received from the enterprise database to extract a first subset of error messages, the error messages in the first subset being generated by devices positioned at a geospatial location that is within a predetermined distance of the IoT node;

in response to the identification of a threshold number of first error messages in the first subset, pulling from the enterprise error database a first remediation routine built to address the first error messages, wherein the first error messages are a group of identical error messages; and transmitting to the IoT node the first remediation routine and instructions to run the first remediation routine, wherein the transmission is performed prior to transmission of the first error message from the IoT node to the IoT hub; and addressing known failures for each IoT node on the user IoT system by:

receiving from the IoT node a second error message, the second error message having been generated by the IoT node and indicating a failure of the IoT node;

pulling, from the enterprise error database, second error messages generated by devices associated with the same device identifier as the IoT node, wherein the pulled second error messages are identical to the second error message generated by the IoT node;

applying the machine learning model to the pulled second error messages to extract a second subset of error messages, the second error messages in the second subset having been generated by devices positioned at a geospatial location within the predetermined distance of the IoT node;

transmitting a first query to the enterprise error database to return a second remediation routine built to address the second error messages in the second subset;

when the first query returns the second remediation routine, transmitting the second remediation routine extracted by the first query to the IoT node together with instructions to run the second remediation routine;

when the first query returns a null value, transmitting a second query to the enterprise error database to return a third remediation routine built to address a third subset of error messages, the third subset including the pulled second error messages less the second subset of error messages; and when the second query returns the third remediation routine, transmitting the third remediation routine extracted by the second query to the IoT node together with instructions to run the third remediation routine.

2. The method of claim 1 wherein the detecting the user devices comprises scanning an area immediately surrounding the IoT hub for user devices.

3. The method of claim 1 wherein the assessing the user devices for conformance with the baseline security protocols and performance characteristics includes:
   accessing a job description of the user stored in a central database; and
   identifying the baseline security protocols and the performance characteristics, the baseline security protocols and performance characteristics being associated with the job description in the central database.

4. The method of claim 3 further comprising:
   determining that a user device is not in conformance with the baseline security protocols and performance characteristics; and
   blocking communication between the user's personal computing device and the user device determined not to be in conformance.

5. The method of claim 4 wherein the determining that the user device is not in conformance includes determining that the user device includes hardware or software that the user is not allowed to use based on the accessed job description of the user.

6. The method of claim 1 wherein the assessing the user devices for conformance with the baseline security protocols and performance characteristics includes:
   accessing a geospatial location of the user stored in a central database; and
   identifying the baseline security protocols and performance characteristics, the baseline security protocols and performance characteristics being associated with the geospatial location in the central database.

7. The method of claim 6 further comprising:
   determining that a user device is not in conformance with the baseline security protocols and performance characteristics; and
   blocking communication between the user's personal computing device and the user device determined not to be in conformance.

8. The method of claim 7 wherein the determining that the user device is not in conformance includes determining that the user device includes hardware or software that the user is not allowed to use based on the accessed geospatial location of the user.

9. The method of claim 1 further comprising, for each of the user devices and prior to the onboarding:
   accessing a remote server to pull baseline security protocols and performance characteristics associated with the user device;
   requesting, from the user device, configuration settings for a configurable setting of the user device;
   identifying a discrepancy between the pulled performance characteristics and the configuration settings of the user device;
   transmitting a patch to the user device to update the configuration settings and bring the configuration settings in conformance with the performance characteristics;
   receiving a failure message from the user device indicating a failure of the user device to update the configuration settings; and
   declining to onboard the user device to the user IoT system;
   wherein:
      the performance characteristics include configuration settings.

10. The method of claim 1 further comprising:
   receiving, from an IoT node included in the user IoT system, a third error message and a fourth error message; and
   determining which error message to process first by:
      accessing a job description of the user;
      identifying, based on stored information associated with the job description, one of the third error message and the fourth error message as a higher impact error message; and
      processing first the error message identified as the higher impact error message.

11. The method of claim 1 further comprising proactively pinging each IoT node on the user IoT system to request a transfer of an error message generated by each IoT node to the IoT hub.

12. The method of claim 1 wherein the monitoring the enterprise data to pre-emptively identify and address probable failures of the IoT nodes prior to failure of the IoT nodes further includes, for each IoT node on the user IoT system:
   identifying a help desk identifier associated with the user IoT system, the help desk identifier identifying a help desk assigned to the user IoT system for remediating failures of the user IoT system;
   periodically requesting, from a help desk historical database associated with the help desk identifier, error messages received by the help desk that were generated by devices associated with a device identifier identical to a device identifier of the IoT node;
   in response to accumulating a threshold number of identical error messages generated within a predetermined time period, pulling from the help desk historical database a remediation routine built to remediate the identical error messages; and transmitting, to the IoT node, the pulled remediation routine and instructions to run the pulled remediation routine.

13. The method of claim 12 further comprising:

receiving a null value from the help desk historical database in response to the pulling of the remediation routine; and generating a message, to the user, of a possible failure of the IoT node.

14. The method of claim 1 further comprising, for each of the IoT nodes:

requesting the IoT node to transmit to the IoT hub customized configuration settings of the IoT node;

pinging the IoT node and not receiving a response from the IoT node;

determining, based on a lack of response from the IoT node to the pinging over a predetermined time period, that the IoT node has deleted itself from the IoT system;

detecting a new user device in electronic communication with the central IoT hub, the new user device being a similar or identical piece of hardware to the IoT node that deleted itself from the IoT system; and when the new user device is onboarded to the IoT system and becomes a new IoT node, transmitting to the new IoT node the configuration settings and instructing the new IoT node to adopt the transferred configuration settings.

15. A method for establishing and supporting a user Internet of Things ("IoT") system, the method being performed by a central IoT hub run on a user's personal computing device, the user being employed in a line of business ("LOB") in a company, the method comprising:

detecting user devices in electronic communication with the central IoT hub;

assessing the user devices for conformance with baseline security protocols and performance characteristics;

onboarding, to the user IoT system, user devices determined to be in conformance with the baseline security protocols and performance characteristics, each of the onboarded user devices being an IoT node on the user IoT system and being associated with a device identifier;

monitoring enterprise data to pre-emptively identify and address probable failures of the IoT nodes prior to failure of the IoT nodes, the monitoring including, for each IoT node on the user IoT system:

periodically requesting, from an enterprise error database, error messages generated from devices associated with the IoT node's device identifier;

applying a machine learning model to error messages received from the enterprise database to extract a first subset of error messages, the error messages in the first subset being generated by devices associated with an employee employed in the LOB;

in response to the identification of a threshold number of first error messages in the first subset, pulling from the enterprise error database a first remediation routine built to address the first error messages, wherein the first error messages are a group of identical error messages; and transmitting to the IoT node the first remediation routine and instructions to run the first remediation routine, wherein the transmission is performed prior to transmission of the first error message from the IoT node to the IoT hub; and addressing known failures for each IoT node on the user IoT system by:

receiving from the IoT node a second error message, the second error message having been generated by the IoT node and indicating a failure of the IoT node;

pulling, from the enterprise error database, second error messages generated by devices associated with the same device identifier as the IoT node, wherein the pulled second error messages are identical to the second error message generated by the IoT node;

applying the machine learning model to the pulled second error messages to extract a second subset of error messages, the second error messages in the second subset having been generated by devices associated with an employee employed in the LOB;

transmitting a first query to the enterprise error database to return a second remediation routine built to address the second error messages in the second subset;

when the first query returns the second remediation routine, transmitting the second remediation routine extracted by the first query to the IoT node together with instructions to run the second remediation routine;

when the first query returns a null value, transmitting a second query to the enterprise error database to return a third remediation routine built to address a third subset of error messages, the third subset including the pulled second error messages less the second subset of error messages; and when the second query returns the third remediation routine, transmitting the third remediation routine extracted by the second query to the IoT node together with instructions to run the third remediation routine.

16. The method of claim 15 wherein the assessing the user devices for conformance with the baseline security protocols and performance characteristics includes:

accessing a central database storing a plurality of baseline security protocols and performance characteristics; and identifying the baseline security protocols and the performance characteristics, the baseline security protocols and performance characteristics being associated with the LOB in the central database.

17. The method of claim 16 further comprising:

determining that a user device is not in conformance with the baseline security protocols and performance characteristics; and blocking communication between the user's personal computing device and the user device determined not to be in conformance.

18. The method of claim 17 wherein the determining that the user device is not in conformance includes determining that the user device includes hardware or software that the user is not allowed to use based on the LOB of the user.

19. A method for establishing and supporting a user Internet of Things ("IoT") system, the method being performed by a central IoT hub run on a user's personal computing device, the method comprising:

detecting user devices in electronic communication with the central IoT hub;

assessing the user devices for conformance with baseline security protocols and performance characteristics, wherein the assessing the user devices includes:

accessing a job description of the user stored in a central database; and identifying the baseline security protocols and performance characteristics, the baseline security protocols and performance characteristics being associated with the job description in the central database;

onboarding, to the user IoT system, user devices determined to be in conformance with the baseline security protocols and performance characteristics, each of the onboarded user devices being an IoT node on the user IoT system and being associated with a device identifier; and monitoring enterprise data to pre-emptively identify and address probable failures of the IoT nodes prior to failure of the IoT nodes, the monitoring including, for each IoT node on the user IoT system:

periodically requesting, from an enterprise error database, error messages generated from devices associated with the IoT node's device identifier;

applying a machine learning model to error messages received from the enterprise database to extract a first subset of error messages, the error messages in the first subset being generated by devices positioned at a geospatial location that is within a predetermined distance of the IoT node;

in response to the identification of a threshold number of first error messages in the first subset, pulling from the enterprise error database a first remediation routine built to address the first error messages, wherein the first error messages are a group of identical error messages; and transmitting to the IoT node the first remediation routine and instructions to run the first remediation routine, wherein the transmission is performed prior to receipt transmission of the first error message from the IoT node to the IoT hub.

20. The method of claim 19 further comprising, for each of the IoT nodes:

requesting the IoT node to transmit to the IoT hub customized configuration settings of the IoT node;

pinging the IoT node and not receiving a response from the IoT node;

determining, based on a lack of response from the IoT node to the pinging over a predetermined time period, that the IoT node has deleted itself from the IoT system;

detecting a new user device in electronic communication with the central IoT hub, the new user device being a similar or identical piece of hardware to the IoT node that deleted itself from the IoT system; and when the new user device is onboarded to the IoT system and becomes a new IoT node, transmitting to the new IoT node the configuration settings and instructing the new IoT node to adopt the transferred configuration settings.

\* \* \* \* \*